US008213037B2

(12) United States Patent  
Klave et al.

(10) Patent No.: US 8,213,037 B2  
(45) Date of Patent: Jul. 3, 2012

(54) MULTIFUNCTIONAL PERIPHERAL PRINT CONTAINER MODIFICATION

(75) Inventors: Daniel Leo Klave, Camas, WA (US); James E. Owen, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1034 days.

(21) Appl. No.: 12/143,649

(22) Filed: Jun. 20, 2008

(65) Prior Publication Data

US 2009/0161137 A1 Jun. 25, 2009

Related U.S. Application Data

(63) Continuation-in-part of application No. 12/003,130, filed on Dec. 20, 2007, and a continuation-in-part of application No. 12/040,683, filed on Feb. 29, 2008.

(51) Int. Cl.
G06F 15/00 (2006.01)
G06F 17/00 (2006.01)

(52) U.S. Cl. ........................................ 358/1.15; 715/274

(58) Field of Classification Search .................... 358/1.6, 358/1.15, 1.14, 1.13, 1.16, 1.18, 402, 304, 358/1.1; 715/274, 769, 837, 839; 235/375; 382/217

See application file for complete search history.

(56) References Cited

U.S. PATENT DOCUMENTS

| 5,907,835 | A | 5/1999 | Yokomizo et al. |
| 6,633,398 | B1 | 10/2003 | Morikawa |
| 6,718,378 | B1 | 4/2004 | Machida |
| 6,827,514 | B1 | 12/2004 | Shima |
| 7,275,063 | B2 | 9/2007 | Horn |
| 2005/0226473 | A1 | 10/2005 | Ramesh |
| 2005/0246724 | A1* | 11/2005 | Foehr et al. ................... 719/321 |
| 2007/0274562 | A1 | 11/2007 | Haruna |
| 2008/0126392 | A1* | 5/2008 | Chrisop et al. ................ 707/102 |
| 2009/0244620 | A1* | 10/2009 | Takahashi et al. ........... 358/1.15 |
| 2009/0303543 | A1 | 12/2009 | Ito |

FOREIGN PATENT DOCUMENTS

| GB | 2334799 | 9/1999 |
| GB | 2334800 | 9/1999 |
| JP | 10-126596 | 5/1998 |
| JP | 2001-125757 | 5/2001 |
| JP | 2001-337943 | 12/2001 |
| JP | 2001-339542 | 12/2001 |
| JP | 2004-153680 | 5/2004 |
| JP | 2005-300605 | 10/2005 |
| JP | 2005-341343 | 12/2005 |
| JP | 2006-157806 | 6/2006 |
| JP | 2007-288474 | 11/2007 |

* cited by examiner

*Primary Examiner* — Saeid Ebrahimi Dehkordy  
(74) *Attorney, Agent, or Firm* — Law Office of Gerald Maliszewski; Gerald Maliszewski

(57) ABSTRACT

A system and method are provided for appending element files to a print container in a multifunctional peripheral (MFP) device. The method accepts a first element file and a print container including a second element file. Examples of element files other print containers, fixed documents, application-specific documents, page description language (PDL) documents, extensible markup language (XML) paper specification (XPS) fixed documents, facsimile documents, and scanned documents. The method modifies the print container to include the second element file and the first element file preserved as separate entities, and stores the modified print container in a tangible memory medium.

18 Claims, 5 Drawing Sheets

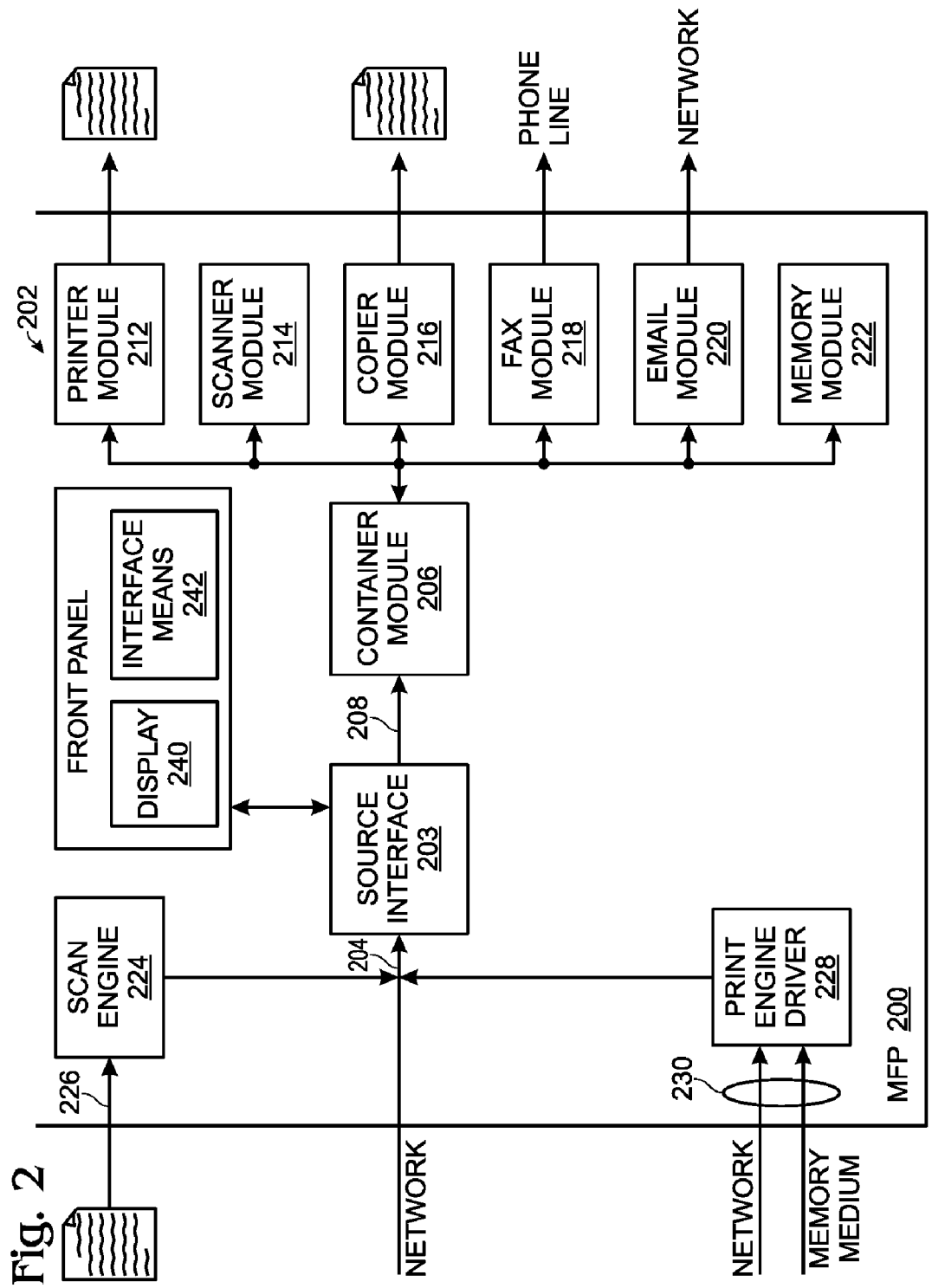

Fig. 3A

| SOURCE DOCUMENTS | PRINT CONTAINER IN GDI | PRINT CONTAINER |
|---|---|---|
| MY REPORT.DOC<br>PAGE 1: PORTRAIT<br>PAGE 2: LANDSCAPE<br>PAGE 3: PORTRAIT | PRINT SETTINGS:<br>PORTRAIT<br>PAGE 1<br>RESETDC: LANDSCAPE<br>PAGE 2<br>RESETDC: PORTRAIT<br>PAGE 3 | JOB<br>  DOCUMENT 1<br>    PAGE 1<br>    PAGE 2<br>    PAGE 1<br>  PRINT TICKETS<br>    DOCUMENT 1 PRINT TICKET:<br>      PORTRAIT<br>      PAGE 2 PRINT TICKET:<br>      LANDSCAPE |
| MY INVOICE.XLS<br>PAGE 1: LANDSCAPE<br>PAGE 2: LANDSCAPE | PRINT SETTINGS:<br>LANDSCAPE<br>PAGE 1<br>PAGE 2 | JOB<br>  DOCUMENT 1<br>    PAGE 1<br>    PAGE 2<br>  PRINT TICKETS<br>    DOCUMENT 1 PRINT TICKET:<br>      LANDSCAPE |

Fig. 3B

| MERGED DOCUMENT | PRINT CONTAINER IN GDI | PRINT CONTAINER IN XPS |
|---|---|---|
| MERGEDDOC.PRN (ONLY PRINT COMMANDS) | PRINT SETTINGS: PORTRAIT<br>PAGE 1<br>RESETDC: LANDSCAPE<br>PAGE 2<br>RESETDC: PORTRAIT<br>PAGE 1<br>RESETDC: LANDSCAPE<br>PAGE 2 | JOB<br>  DOCUMENT 1<br>    PAGE 1<br>    PAGE 2<br>  DOCUMENT 2<br>    PAGE 1<br>    PAGE 2<br>PRINT TICKETS<br>  DOCUMENT 1 PRINT TICKET: PORTRAIT<br>  PAGE 2 PRINT TICKET: LANDSCAPE<br>  DOCUMENT 2 PRINT TICKET: LANDSCAPE |

MULTIFUNCTIONAL PERIPHERAL PRINT CONTAINER MODIFICATION

RELATED APPLICATIONS

This application is a continuation-in-part of a pending application entitled PERSONAL DOCUMENT CONTAINER, Daniel Klave, Ser. No. 12/003,130, filed on Dec. 20, 2007, which is incorporated herein by reference.

This application is a continuation-in-part of a pending application entitled INTERFACE FOR BUILDING A PRINT CONTAINER, Levin et al., Ser. No. 12/040,683, filed on Feb. 29, 2008, which is incorporated herein by reference.

BACKGROUND OF THE INVENTION

1. Field of the Invention

This invention generally relates to electronic document software and, more particularly, to a multifunctional peripheral (MFP) capable of modifying a print container that preserves entities in the container as separate elements.

2. Description of the Related Art

Conventional methods exist for combining print containers into a single print container. Applications such as SharpDesk™ allow the user to print any document and save the resulting commands as a print container (i.e., a SharpDesk™ document). SharpDesk™ then allows the user to view all such print containers. A useful function in SharpDesk™ consists of combining the print containers into new print containers. This function allows a user to combine related print containers into a single print container that can be printed or sent as email or used in many in document management functions.

More generally, each act of printing involves a single application printing a single document producing a single print container. Normally, the act of printing streams the print container to a spooler or directly to the printer, and the print container is not available to the user. However, most OSs include a "Print to File" capability that saves the print container. To clarify, some terms are presented that are derived from the XML Paper Specification (XPS). For example, the act of printing a single document in an application produces a print container with a single fixed document that includes the print commands for rendering the pages in that document. The fixed document contains fixed pages, or the print commands that render each page. Hence, a print container contains only the print commands pertaining to a single fixed document, so the print container is described as a print document. One problem with the merged print container is the loss of distinct fixed documents used to create the merged print container.

An additional issue is the merging of print settings. Print settings are values that affect the way the print commands are executed, for example, landscape vs portrait, 1 up vs 2 up, etc. Conventionally (e.g., GDI printing), print settings are applied at the beginning of the print document, and occasionally as special commands in between pages (resetDC). With this scheme, creating a merged print container by appending a print document involves inserting a resetDC before the new pages are added.

Merging applications strip most of the print settings, except for crucial ones, such as portrait vs landscape. Hence, the merger of multiple print containers into a print container is usually consistent with the print document format built into the OS: the print container contains fixed pages with no distinction of the original print container, and the print settings are a series of resetDCs, again not tied to the original print container.

Another issue in conventional printing is that electronic documents often appear one way when viewed on a monitor screen and another way when printed. Further, many documents depend on locally installed software, fonts, and other resources. When a document is viewed on different computers, aspects of the document, such as page layout, image color, and font style, can change, altering the document's appearance. Consequently, a document's appearance depends greatly on where and how the document is viewed.

The appearance of the printed version of a document can also vary, depending on the printer used. Unfortunately, there is no guarantee that users with different printers attached to different machines will see the exact same document printed on paper as when the document is viewed on the monitor screen.

The above-mentioned issues are being addressed with a document technology called the XML Paper Specification (XPS). This specification is designed to provide users with a consistent document appearance regardless of where and how the document is viewed, and also supports a new document structure for distribution and archiving. This new document structure can include documents created by different applications, all gathered into a single XPS file called a 'container'. The problem is that, at present, there is no convenient way to combine a set of such documents into a single XPS container (file).

In addition, the included set of documents may exist in a variety of application formats, each requiring conversion to the XPS (XML) document format if the user wants to maintain the XPS container as an archival, distributable entity.

Currently, it is possible to construct, manually, an XPS container containing a mix of application derived documents. However, the task is awkward and subject to errors. Also, doing this task manually makes the inclusion of print tickets for the entire container (job level), the specific documents (document level), and within specific sections of a specific document difficult to accomplish. It is also unclear whether Microsoft™ will support adding documents from non-Microsoft applications, although, XPS supports having such a mix of documents.

Lastly, it is unclear whether such capability will include accessing specific files within the XPS container, to add print ticket options without the applications used to originally create the documents.

XPS Documents maintain a consistent appearance for documents—despite environmental variables—through the use of a fixed page layout. XPS Documents are fixed-format documents described by an XML-based language. This means the document layout is fixed, just as it would be if it were printed on a piece of paper. As a result, an XPS viewer and the XPS print path can present the document in the same way to the user, whether it is viewed in a window or on a piece of paper. Custom resources and other application-specific metadata can also be included in an XPS Document, allowing applications to create and use XPS document packages. Unlike other file formats, XPS container files can be stored and archived with all the content and design details in tact. XPS document packages describe their contents using a plain-text, XML-based data format, as opposed to a proprietary binary format.

Intended as the replacement for the Enhanced Metafile (EMF) format which was the previously used print spooler format in the GDI print path, the XPS document format is the same as the spooler format used in the XPS print path. It serves as the page description language (PDL) for printers. For printers supporting XPS, this eliminates an intermediate conversion to a printer-specific language, increasing the reliability and fidelity of the printed output. The document format consists of structured XML markup that defines the layout of a document and the visual appearance of each page, along with rendering rules for distributing, archiving, rendering, processing and printing the documents. Notably, the markup language for XPS is a subset of XAML, allowing it to incorporate vector-graphic elements in documents, using XAML to mark up the WPF primitives. The elements used are described in terms of paths and other geometrical primitives.

The XPS Document package is a compressed ZIP archive that allows the resulting file to regain some of the space efficiency that is lost by using an XML-based language. The XPS Document package complies with the Open Packaging Conventions.

XPS Documents are stored in a file, called a package, composed of a set of document components, known as parts. A package has a physical and a logical organization. The physical organization consists of the document parts and folders inside the package, and the logical organization is a hierarchy described by the document parts. The XML Paper Specification applies a specific organization and naming convention to the logical layer for XPS documents.

The parts of an XPS document are organized in a logical hierarchy with the FixedDocumentSequence part at the top. An XPS document package may contain more than one document and the sequence of these documents is described by the FixedDocumentSequence part. The FixedDocumentSequence part references the FixedDocument parts that, in turn, reference the pages of each document within the package.

Each FixedDocument part references the pages of that document as FixedPage parts. Each FixedPage part contains the text markup and layout of a page in the document as well as references to images, fonts, and other custom resources used in the page. Resources such as images and fonts are stored in the package but outside of the FixedPage part, allowing them to be shared by other pages. This is especially useful for font resources, but it could also be useful for any image resources that are used on more than one page, such as a watermark or letterhead logo.

FIG. 1 is a diagram depicting the logical hierarchy of an XPS document (prior art). This example shows the contents of a package that contains two separate documents, each containing two pages. The package in this example could be a presentation where FixedDocument_1 contains the slides while FixedDocument_2 contains the background information.

As used herein, an MFP is a device capable of a function such as printing, copying, scanning, faxing, emailing, displaying, storage, and networked communications. Typically, an MFP performs more than one function. Conventionally, MFP electronic documents and/or images may be stored and/or managed by a document management system (DMS). A DMS is a type of computer system capable of storing and retrieving electronic documents and/or images. The documents and images stored on a DMS may be held in a wide variety of formats or in a number of geographic locations. A DMS may be configured to allow for the control and recording of changes to documents. Additionally, a DMS may be configured to measure the volume of use of documents stored and/or retrieved. Generally, a DMS is a large server-based storage system configured for centralized archival and sharing of information. As such, in addition to the imaging device, a DMS typically requires additional hardware and/or software for the management of electronic documents and images. Therefore, a conventional DMS may not be a convenient solution for personal management of electronic documents and images.

It would be advantageous if an MFP had to capability of modifying a print container, so that the container could hold multiple files segregated as separate entities.

SUMMARY OF THE INVENTION

Disclosed is a method that fills the need for a convenient print container that can be used to store and manage scanned documents and images on an MFP. Instead of depending on XPS, print files or other document management formats may be used in conjunction with the print container. The print container can store multiple documents as a series of pages. By embedding document information, such as the name of document or number of pages, the print container can support multiple distinct documents, just like XPS. Thumbnails, digital signature, and rights management information can also be embedded. The MFP can create a print container, or modify an existing print container.

Accordingly, a method is provided for appending element files to a print container in a multifunctional peripheral (MFP) device. The method accepts a first element file and a print container including a second element file. Examples of element files include print containers, fixed documents, application-specific documents, page description language (PDL) documents, extensible markup language (XML) paper specification (XPS) fixed documents, facsimile documents, and scanned documents. The method modifies the print container to include the second element file and the first element file preserved as separate entities, and stores the modified print container in a tangible memory medium.

Modification of the print container may include an operation such as adding a document, adding pages to an existing document, deleting a document, deleting selected pages of a document, changing a document name, modifying an image format of at least one part of a document, changing the name of the personal document container, reordering pages within a document, splitting a document into multiple documents, modifying the format of a document, saving a document in an alternative format, performing image enhancement on a document, or performing optical character recognition on a document.

Additional details of the above-described method are described in more detail below.

BRIEF DESCRIPTION OF THE DRAWINGS

FIG. 2 is a schematic block diagram depicting a system for appending element files to a print container in a multifunctional peripheral (MFP) device.

FIGS. 3A and 3B are tables illustrating an exemplary comparison of documents arranged in a GDI print container, with the present invention print container.

DETAILED DESCRIPTION

Figure 1:
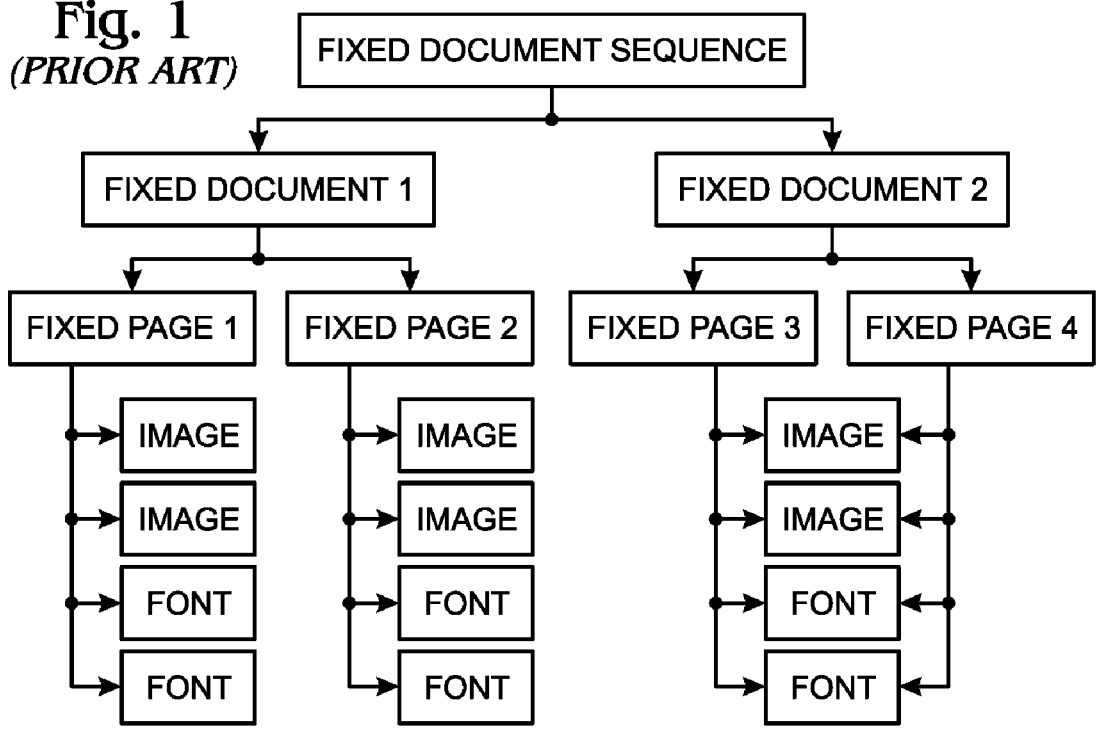
FIG. 1 is a diagram depicting the logical hierarchy of an XPS document (prior art).

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "processor", "processing device", "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various embodiments will be presented in terms of systems that may include a number of components, modules, and the like. It is to be understood and appreciated that the various systems may include additional components, modules, etc. and/or may not include all of the components, modules etc. discussed in connection with the figures. A combination of these approaches may also be used.

The various illustrative logical blocks, modules, and circuits that have been described may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the node, or elsewhere. In the alternative, the processor and the storage medium may reside as discrete components in the node, or elsewhere in an access network.

FIG. 2 is a schematic block diagram depicting a system for appending element files to a print container in a multifunctional peripheral (MFP) device 200. The system 202 comprises a source interface 203 connected on line 204 to supply a first element file and print container including a second element file. A container module 206 is connected to the source interface on line 208 to accept the first element file and the print container. The container module has an output on line 210 to supply a print container modified to include the second element file and the first element file preserved as separate entities. In addition to the modification function, the container module 206 may additionally create a print container, or access a pre-existing print container.

As used herein, a print container is an electronic folder that includes an electronic file that contains enough information to print or view its contents. The print container typically contains individual pages and a set of instructions on how to print the pages. In newer formats, the print container may contain multiple collections of pages or documents. The print instructions can apply to the whole print container, to a single document, or to an individual page. A print container is distinct from an electronic document because the print container does not contain information how to edit the document. For example, a Word document distinguishes between the header and footer and the main body of the text, where a print container would simply contain text in different locations, with no distinction of original intent. While print containers can organize repetitive data (such as headers and footers) efficiently, the primary purpose is print or view performance, not editability. Lastly, print containers can be searched and indexed, and can contain extraneous non-print related data, but again, the main purpose of the print container is associated with printing or viewing.

The container module 206 modifies the print container by adding a document, adding pages to an existing document, deleting a document, deleting selected pages of a document, changing a document name, modifying an image format of at least one part of a document, changing the name of the personal document container, reordering pages within a document, splitting a document into multiple documents, modifying the format of a document, saving a document in an alternative format, performing image enhancement on a document, or performing optical character recognition (OCR) on a document. Alternately, the container module 206 accesses the print container by extracting a document, or extracting selected pages of a document.

The first and second element files may be (other) print containers, fixed documents, application-specific documents, page description language (PDL) documents, extensible markup language (XML) paper specification (XPS) fixed documents, scanned documents, facsimile documents, or combinations of the above-mentioned elements. For example, a financial report in Microsoft Word™ format may be an example of an application-specific document.

Typically, the container module 206 may supply the print container to be modified to one of the following modules: printer module 212, scanner module 214, a photocopier module 216, a facsimile module 218, an email module 220, a memory module 222, or combinations of the above-mentioned modules. For example, if supplied to the printer or photocopier modules, printed or photocopied pages are added to the print container. If supplied to the scanner module, scanned pages are added to the print container. If supplied to the fax module 218, faxed pages are added to the print container. If supplied to the email module 222, sent or received emails, or email attachments, are added to the print container. If supplied to the memory module 222, a file in memory can be added to the print container, or a modified print container can be stored.

In one aspect, the container module 206 preserves the first element file as a separate entity in the print container by creating a print container element hierarchy of jobs in the print container, fixed documents in a job, and/or fixed pages in a fixed document. Then, the container module 206 may modify the print container by modifying the print container element hierarchy. As used herein, a fixed document is defined as a document that includes print commands for rendering a document of one, or more pages. That is, a fixed document includes fixed pages and/or print comments (e.g., PDL) for rendering each page. Likewise, a fixed page is a page that includes print commands for rendering that page. Examples of fixed documents include pdf files, raster images, and XPS fixed documents, to name a few.

In a different aspect, the source interface supplies a first element file with a print ticket (PT) disposition, and the container module 206 selectively preserves the PT disposition of the first element file in the print container. More explicitly, the container module 206 may selectively preserve the PT disposition of the first element file in the personal document container by creating a PT hierarchy of job PTs in the personal document container, fixed document PTs in a job, and/or fixed page PTs in a fixed document. Then, the container module may selectively preserve the PT disposition by modifying a PT hierarchy of job PTs in the personal document container, fixed document PTs in a job, and/or fixed page PTs in a fixed document.

In one aspect, the MFP 200 includes a scan engine 224 having an input associated with reference designator 226 to accept a physical medium document. The scan engine 224 scans the physical medium document and supplies the scanned document to the source interface as the first element file on line 204. In another aspect, the MFP 200 includes a print engine driver 228 having an input on line 230 to accept a print job. The print job may be supplied by a computer, server, or memory medium interface (not shown). The print engine driver supplies a fully rendered printer-ready intermediate file to the source interface on line 204 as the first element file. For example, the fully rendered printer-ready intermediate file may be halftoned.

In another aspect, the container module 206 creates a print container resource and a pointer corresponding to the first element file in the print container, associating the first element file with the resource.

In one aspect, the MFP includes a front panel, browser, user interface, or graphical user interface (GUI) enabled as a display 240 and an interface means 242 that permit a user to interact or respond to displayed GUI images. The interface means 242 may be a keyboard, keypad, mouse, or touchscreen for example. Details of a GUI and UI have been supplied in parent application Ser. No. 12/040,683, which is incorporated herein by reference.

Thus, a UI can be opened and used to select specific files. The list of files selected by the user may be combined into a single file called a print container. If the files are not in the desired format, then optionally a conversion could be implemented that produces a fixed document. Print tickets can be add or modified for selected element files. For example, a job level set of print tickets may be created within the print container. Alternately, a document level set of print tickets may be created for each document, in sequence, or a page level set of print tickets may be selected pages within each document.

The user can use a GUI to access, sequentially, individual documents and containers, make conventional selections for printing and finishing options, create fixed documents as output, and then place the document in a print container. Without closing the print container, the user can then access another document and continue the process of building print tickets for that document, saving the results in the same print container file as the previous document.

In one mode of operation, the container module accumulates the individual element files, one at a time, providing the user the opportunity to add, modify, or delete existing print tickets. The user can store the modified document into the print container and select a new element file, continuing the operation until all elements are put in the container and the container stored or sent to a printer.

Afterwards, the user may be prompted by the UI for any job level options. The container module then converts the job level selections into job level print tickets and places them in the correct locations within the print container file.

Functional Description

At the MFP, a user can scan pages into an existing document or create a new document. A print container can be imported on a USB flash drive, or accessed on the network. The MFP can then be used for basic document management tasks, such as adding a document, deleting a document, print a document, or ImageSend a document. In addition, basic page level tasks can be performed such as add pages, delete pages, print pages, and ImageSend pages. Further, pages can be added to the print container with a human readable summary of the metadata. In one aspect, the MFP uses a modified version of a conventional XPS file as a wrapper for element files.

The present invention print container can store multiple scanned documents. Each element file in the print container may be treated as individual page, or with the use of special tags, the element files can be distinguished as individual documents. Thumbnails, digital signatures, and rights management information can also be managed in a print container using special tags to support these features.

The user can create a new container, modify an existing container, or access an existing print container at the MFP. The user can create, modify, or access a container on a shared network folder, a portable USB flash drive, or the MFP hard drive. For example, at the MFP front panel, the user may indicate they wanted to create a print container. The user then selects the location for the container, and enters or accepts a default file name. Next, the user sets up the documents for scanning into the container.

The user enters or selects a default name for the first document. One of the available image formats is selected. Any additional scan options are also selected such as exposure, color mode, resolution, or compression. The pages are scanned (1 to n) for the first document. The user interface permits an image format change on a page-by-page basis. When the first document is complete, the user may close the container, or add another document. When all documents are scanned, the container is closed, and the user is done.

The MFP front panel can also be used to modify a print container. The user selects an existing print container by location and file name. The user then selects the type of modification, such as: add a new document, add pages to an existing document, delete a document, delete 1 to n pages from a document, extract 1 to n pages from an existing document into a new document, or change a document name. The user interface "walks" the user through making the selected modification. When all modifications are done, the container is closed.

To access a print container using the MFP front panel, the user selects the existing print container by location and file name. The user selects an operation such as: print a document (or 1 to n pages of a document), or ImageSend a document (or 1 to n pages of a document).

Many print files include comment commands that are conventionally ignored by an MFP. A PCLXL document, for example, can have comments distinguished by "??". PostScript comments are distinguished by the percent (%) symbol. PDF comments are distinguished by the percent (%) symbol. The use of such comments can be used to include document information in a print container.

If the print container is implemented as an XPS wrapper, each element file can be treated as an XPS fixed Document. In another aspect, visible metadata can be used in a print container. Instead of hiding document, thumbnail, digital signatures, and Rights management information in comments, a cover page, or multiple pages can be interspersed in the jobs that are added to the personal container. These added pages contain a human readable description of the metadata. In addition to the name of the document, the number of pages, a thumbnail could be rendered for all the pages, or just the first page of each document.

Using the above-described print container GUI associated with the MFP front panel, two new capabilities are available for the printing of documents:

a) An extra level of hierarchy exists in the print container. That is, a job may contain multiple elements files;

b) Print Settings may be organized by Job, Document, and Page—instead of resetDCs.

Using the print container building process, a user can distinguish the sections of the printout that belong to which original documents. Further, the user can set print settings at the different levels easily. For example, a user can set the first document to 2up while the second document remains 1up. This type of hierarchical manipulation of print settings is more intuitive than inserting resetDCs.

It is notable that there are several conventional applications that allow merging of XPS containers. However, these merging applications do not keep separate the individual documents or the print settings.

FIGS. 3A and 3B are tables illustrating an exemplary comparison of documents arranged in a GDI print container, with the present invention print container. In FIG. 3A, one source document is called "My report" and it includes 3 separate pages. In the GDI container, ResetDCs are used to separate the pages so that the page orientation (landscape/portrait) can be called. In the present invention print container, Print Tickets are used for orientation.

Figure 4:
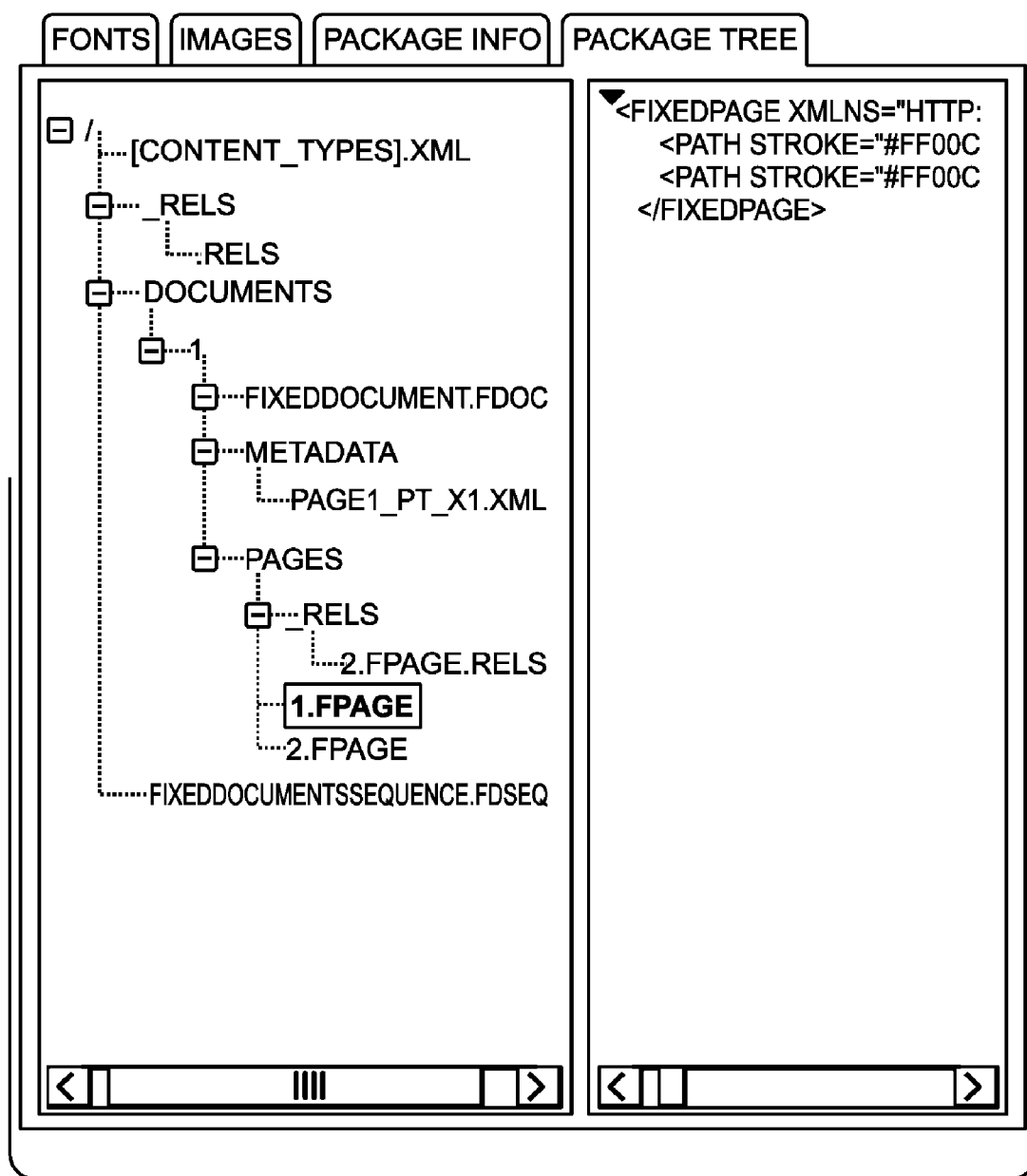
FIG. 4 is a diagram depicting an exemplary hierarchy of elements in a print container.

FIG. 4 is a diagram depicting an exemplary hierarchy of elements in a print container. The documents can be any mix created by different applications, i.e., the set of documents is not restricted to the same vendor, and they are not restricted to the same applications. The user can build the print container from a mix of existing print containers, fixed documents, and application-specific documents. The user can organize the print container at the job level, the document level, and the page level all at the same time, using familiar (printer driver) software with intuitive extensions.

The printer driver automates many manual functions, such as opening the application associated with the document being worked on in order to facilitate an image processing interaction between the application and the printer driver.

Figure 5:
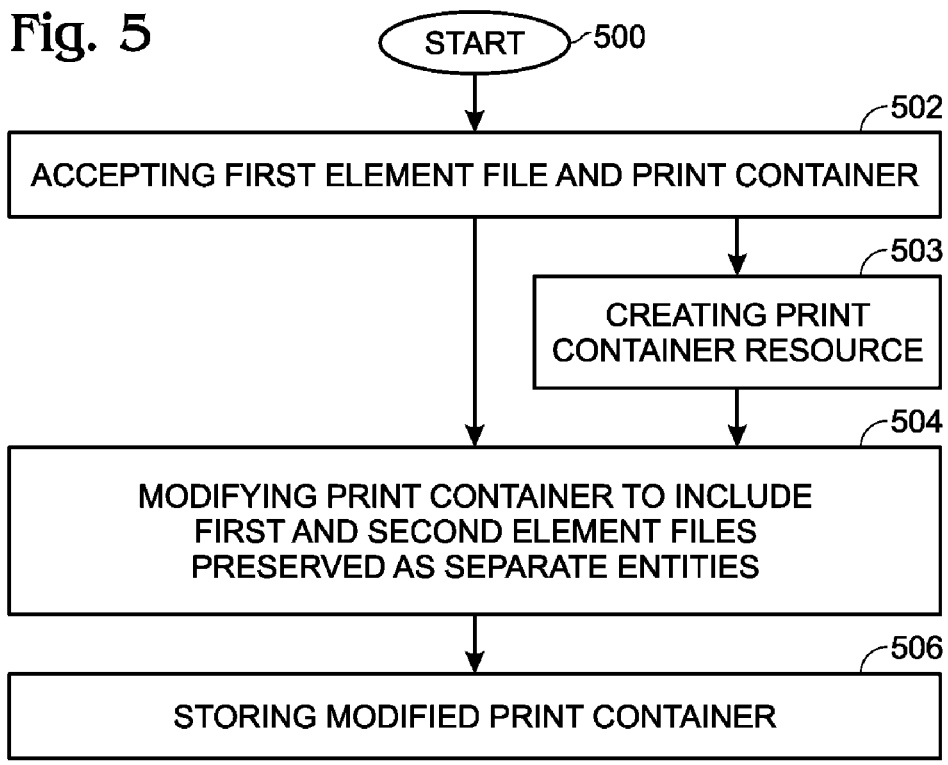
FIG. 5 is a flowchart illustrating a method for appending element files to a print container in an MFP device.

FIG. 5 is a flowchart illustrating a method for appending element files to a print container in an MFP device. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 500.

Step 502 accepts a first element file and a print container including a second element file. Step 504 modifies the print container to include the second element file and the first element file preserved as separate entities. Step 506 stores the modified print container in a tangible memory medium.

In one aspect, accepting the first element file and print container in Step 502 includes accepting first and second element files that may potentially be print containers, fixed documents, application-specific documents, PDL documents, XML XPS fixed documents, facsimile documents, scanned documents, and combinations of the above-mentioned elements. JPEG, TIFF, PNG, and HD Photo are some examples of scanned document formats.

In another aspect, modifying the print container in Step 504 may include performing one of the following operations: adding a document, adding pages to an existing document, deleting a document, deleting selected pages of a document, changing a document name, modifying an image format of at least one part of a document, changing the name of the personal document container, reordering pages within a document, splitting a document into multiple documents, modifying the format of a document, saving a document in an alternative format, performing image enhancement on a document, or performing OCR on a document.

In a different aspect, preserving the first and second element files as separate entities in the print container (Step 504) includes creating a print container element hierarchy of jobs in the print container, fixed documents in a job, and fixed pages in a fixed document.

In one variation, Step 503 creates a print container resource and a pointer corresponding to the first element file in the print container, associating the first element file with the resource. Then, modifying the print container in Step 504 includes adding the resource to the print container.

A system and method of modifying a print container has been presented, for use in an MFP device. Examples of particular structures and process steps have been given to illustrate the invention. However, the invention is not limited to merely these examples. Other variations and embodiments of the invention will occur to those skilled in the art.

We claim:

1. In a multifunctional peripheral (MFP) device, a system for appending element files to a print container, the system comprising:

a MFP device source interface configured to accept a first element file;

the MFP device source interface accepting a second element file;

a container module connected to the source interface to accept the first element file and the second element file, and having an output to supply a print container including the second element file and the first element file preserved as separate entities; and, wherein the first and second element files are selecting from a group consisting of print containers, fixed documents, application-specific documents, page description language (PDL) documents, extensible markup language (XML) paper specification (XPS) fixed documents, scanned documents, facsimile documents, and combinations of the above-mentioned elements.

2. The system of claim 1 wherein the container module additionally performs a function selected from a group consisting of creating and accessing the print container.

3. The system of claim 2 wherein the container module accesses the print container by performing an operation selected from a group consisting of extracting a document and extracting selected pages of a document.

4. The system of claim 1 wherein the container module modifies the print container by performing an operation selected from a group consisting of adding a document, adding pages to an existing document, deleting a document, deleting selected pages of a document, changing a document name, modifying an image format of at least one part of a document, changing the name of the personal document container, reordering pages within a document, splitting a document into multiple documents, modifying the format of a document, saving a document in an alternative format, performing image enhancement on a document, and performing optical character recognition on a document.

5. The system of claim 1 wherein the container module supplies the print container for modification to a module selected from a group consisting of a printer module, a scanner module, a photocopier module, a facsimile module, an email module, a memory module, and combinations of the above-mentioned modules.

6. The system of claim 1 further comprising:
a scan engine having an input to accept a physical medium document, the scan engine scanning the physical medium document and supplying the scanned document to the source interface as the first element file.

7. The system of claim 1 further comprising:
a print engine driver having an input to accept a print job and to supply a fully rendered printer-ready intermediate file to the source interference as the first element file.

8. The system of claim 1 wherein the container module preserves the first element file as a separate entity in the print container by creating a print container element hierarchy of jobs in the print container, fixed documents in a job, and fixed pages in a fixed document.

9. The system of claim 8 wherein the container module modifies the print container by modifying the print container element hierarchy.

10. The system of claim 1 where the container module creates a print container resource and a pointer corresponding to the first element file in the print container, associating the first element file with the print container resource.

11. The system of claim 1 wherein the source interface supplies a first element file with a print ticket (PT) disposition; and,
wherein the container module selectively preserves the PT disposition of the first element file in the print container.

12. The system of claim 11 wherein the container module selectively preserves the PT disposition of the first element file in the print container by creating a PT hierarchy of job PTs in the print container, fixed document PTs in a job, and fixed page PTs in a fixed document.

13. The system of claim 11 wherein container module selectively preserves the PT disposition by modifying a PT hierarchy of job PTs in the print container, fixed document PTs in a job, and fixed page PTs in a fixed document.

14. In a multifunctional peripheral (MFP) device, a method for appending element files to a print container, the method comprising:
an MFP device accepting first element file;
accepting a second element file;
creating a print container including the second element file and the first element file preserved as separate entities;
storing the print container in a tangible memory medium;
retrieving the print container from the tangible memory medium;
performing a print job in response to processing the print container; and,
wherein the first and second element files are selected from a group consisting of print containers, fixed documents, application-specific documents, page description language (PDL) documents, extensible markup language (XML) paper specification (XPS) fixed documents, facsimile documents, scanned documents, and combinations of the above-mentioned elements.

15. The method of claim 14 further comprising
modifying the print container by performing an operation selected from a group consisting of adding a document, adding pages to an existing document, deleting a document, deleting selected pages of a document, changing a document name, modifying an image format of at least one part of a document, changing the name of the personal document container, reordering pages within a document, splitting a document into multiple documents, modifying the format of a document, saving a document in an alternative format, performing image enhancement on a document, and performing optical character recognition on a document.

16. The method of claim 14 wherein preserving the first and second element files as separate entities in the print container includes creating a print container element hierarchy of jobs in the print container, fixed documents in a job, and fixed pages in a fixed document.

17. The method of claim 16 further comprising:
creating a print container resource and a pointer corresponding to the first element file in the print container, associating the first element file with the print container resource; and,
wherein modifying the first print container includes adding the print container resource to the print container.

18. A print driver application, enabled as a sequence of software instructions executable by a processor, performing a method for appending element files to a print container, the method comprising:
a print driver interface accepting a first element file;
accepting a second element file;
a print driver output supplying a print container including the second element file and the first element file preserved as separate entities; and,
wherein the first and second element files are selected from a group consisting of print containers, fixed documents, application-specific documents, page description language (PDL) documents, extensible markup language (XML) paper specification (XPS) fixed documents, facsimile documents, scanned documents, and combinations of the above-mentioned elements.

* * * * *